Jan. 29, 1952

ERNEST KATZ
NOW BY JUDICIAL CHANGE OF NAME
ERNEST HENRY CASSON
WELDING MACHINE
Filed Aug. 9, 1947

2,583,575

INVENTOR.
BY

Patented Jan. 29, 1952

2,583,575

UNITED STATES PATENT OFFICE 2,583,575

WELDING MACHINE

Ernest Katz, Haifa, Palestine; now by judicial change of name Ernest Henry Casson Application August 9, 1947, Serial No. 767,714
In France April 21, 1942

Section 1, Public Law 690, August 8, 1946
Patent expires April 21, 1962

5 Claims. (Cl. 219—4)

The present invention relates to welding machines, more particularly to welding machines for uniting metal sheets. Spot or seam welding machines now in use cannot be employed for welding together a plurality of metals having too dissimilar metallurgical properties. The object of the present invention is to overcome this and other disadvantages. The principle of the invention may be explained by way of an example according to which a sheet of aluminium is to be bonded or united with two sheets of steel. The invention affords fusing or uniting of metals of different kind by means of a machine adapted to carry into practice the above mentioned fusion in a very simple, effective and economical manner.

Figure 4:
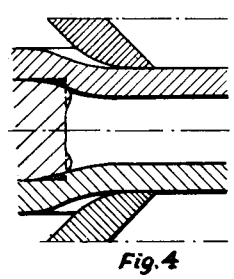
Figure 5:
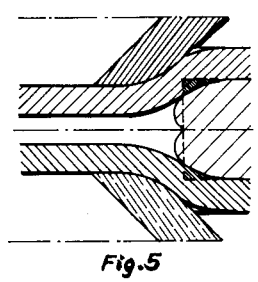
Figure 6:
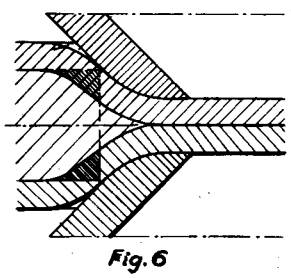

Figs. 4 to 6, inclusive, illustrate certain steps in performing the welding operation.

Figure 7:
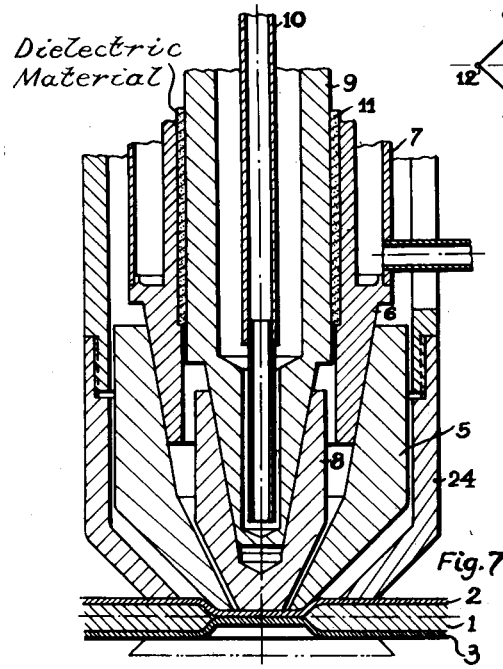

Fig. 7 is a fragmentary sectional view of the welding machine incorporating features of the invention.

Figure 8:
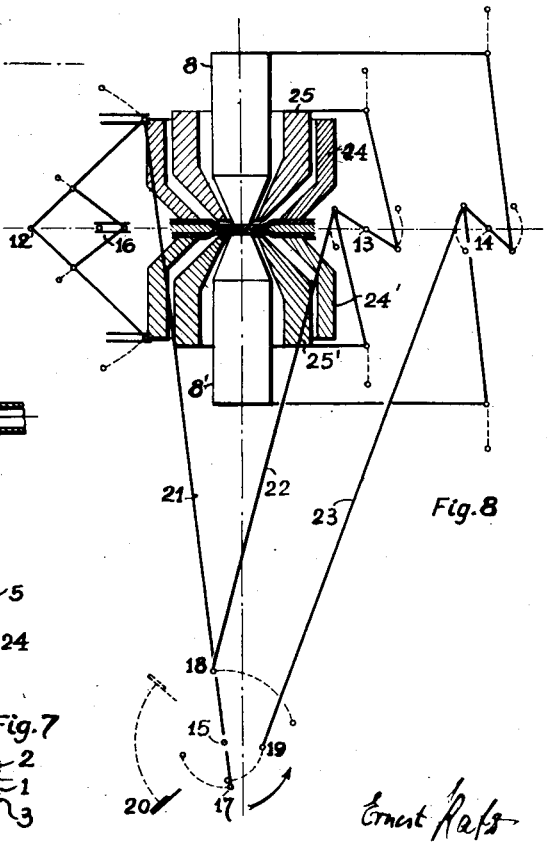

Fig. 8 shows partly in section and schematically electrodes of Fig. 7 (on a reduced scale) and the means for guiding same.

Figure 1:
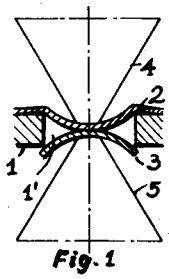
Fig. 1 shows schematically in section a plurality of metal sheets and the position of the electrodes relatively thereto.
Figure 2:
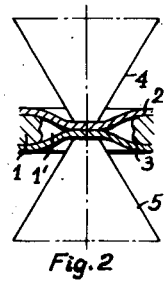
Fig. 2 is a view similar to that of Fig. 1 but with the sheets in a different position.

Fig. 1 shows a section through the sheets at the centre of the welding spot. Aluminum sheet 1 is perforated at 1', the hole having such a diameter as is necessary to enable electrodes 4, 5, of a spot welder to indent steel sheets 2 and 3. When these latter sheets contact each other within the space defined by hole 1' spot welding will occur. The edges or wall of the hole may be rounded off either beforehand or by the effect of the indentation, (Fig. 2).

Figure 3:
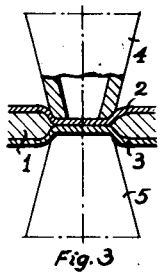
Fig. 3 illustrates in section the application of modified electrodes to the sheets.

For better joints the indentation has to be more dish-like calling for greater diameters of the electrode faces and of the hole (Fig. 3). For reducing the current intensity which this increased diameter would produce, each electrode is provided with an annular face.

The annular electrode is used to obtain the closest joint between the three superpositioned pieces and this is so in all those cases where the exterior pieces have a fusion point sufficiently higher than the piece positioned therebetween. In the present example, the diameter of the hole in the aluminium sheet 1, the thickness of the sheets 2, 3 and the shape of the electrode 4 or 5 are related to one another in such manner as to produce, by softening or melting the aluminium, a filling up of the annular space that is formed by the cylindrical surface of the hole and the inner surfaces of the two steel sheets. These phases and steps are indicated on an enlarged scale and as half-sections in Figs. 4, 5 and 6. The dotted lines indicate the initial shape of the aluminium sheet and the hatched portions indicate aluminium in the process of being squeezed into the annular space.

For practical applications the annular electrode will be used solely for producing the indentation whilst the welding operation will be carried out by an electrode of the usual pattern. Those two operations may be coupled by means of a combined press-welding machine, shown in Figs. 7 and 8 as an example. The blank holders 24 and 24' are guided by the arrangement of scissor-like rods the position of which is determined by pivots 12 and 16 and which hold the three pieces in the theoretical middle of the device and hence appropriately to the working position of the annular electrodes 25 and 25' and the welding electrodes 8 and 8' (Fig. 8). The annular electrodes 5 and 5' produce the indentation. They are electrically heated and moved by the column 6. The latter is cooled by a cooling medium passing within a sleeve 7. The welding electrodes 8 and 8' are connected to the electrical current, are cooled as usual and moved by the column 9, the latter containing a cooling water pipe 10 and being guided in the insulating bushing 11. In Fig. 8, the rotation points 12, 13, 14 and 15 and the slideway 16 are fixed points, linked to the body of the machine or the mobile device. The dotted lines indicate the path of movement of the different articulations. Points 17, 18 and 19 and pedal 20 form a solid entity rotating around fixed point 15. The connecting rod or lever 21, linked to articulation 17, actuates the scissor rod gear and in consequence blank holders 24 and 24'. Connecting or steering rod 22, linked to articulation 18, actuates the annular electrodes 25 and 25' through the lever that turns about fixed point 13 and through the pair of push rods. The steering or movement controlling levers or rods 21, 22 and 23 may be provided with elastic members.

When the rotation of the body about fixed point 15 starts first the blank holders 24—24' are actuated. Then, while the elastic member inserted in rod 21 is being compressed, the annular electrodes 25—25' indent the outer sheets. At their bottom dead center the centre line of rod 22 is coincident with point 15; hence, while the welding electrodes approach the sheets for performing the spot weld, the annular electrodes are retracted from the sheets, thus avoiding a shunt effect during the welding which follows at the end of the operating cycle. Fig. 8. shows the machine in this position.

In their working position the welding electrodes, and the annular electrodes too, may be subjected to a regulated or modulated pressure. This may be obtained by the usual means ordinarily used for forging of the welding point. For instance, for modulating the electrode pressure a pneumatic cylinder is introduced in rod 23 the piston of which is exposed to variable pressures which are reproduced in the system 19—23—14—8—8′. The action of the cylinder is thus superposed on the general movement the action of which is possibly too rough for those very small variations passed through during a very small fraction of the complete cycle. The action of the cylinder will be adapted to each case according to the metallurgical requirements. Assuming, e. g., that from the beginning of an action of the blank holders till the removal of welding electrodes one complete cycle be equivalent to a 90°-rotation of the body about point 15 and that the welding phase therein comprise 20°, the latter will be divided as follows:

At 70° point 19 starts moving rod 23 until, at 84°, the welding electrodes touch the sheets. From this moment onwards the volume of the cylinder is under pressure. The latter's increase will eventually switch on the welding current at 84° by means of a pressure governed switch gear. From 84° to 85°: preheating of the sheets and commencement of fusion. During this period point 19 advances but cannot increase the pressure of the electrodes much, provided the cylinder is actuated pneumatically or oleopneumatically. At 85° a time lag relay produces a leakage in the feed line to the cylinder thus reducing the electrode pressure and also compensating the further advance of point 19. From 85° to 86°: fusion. At 86° a time lag relay switches off the welding current. During the solidification from 86° to 87.5° the leakage maintains the reduced electrode pressures. At 87.5° a time lag relay stops the leakage and connects the cylinder to a feed of increased pressure the rate of which is related to the eutectic requirements. This phase of hot forging is finished at 90° by the automatic return of the gear to 0°. The details of this modulation are given in a merely explanatory and not limitating intention.

The welding electrodes and the annular electrodes may be fed by a single transformer. At the bottom dead centre of the annular electrodes, at the termination of the indentation, the transformer connections are automatically changed to the now following welding phase by means of a switch gear governed by the main gear, e. g. by articulation 18 touching a contact. After welding the connections return to the annular electrodes' feeding position.

If the annular electrodes are not perfectly concentrically placed with respect to the centre line of the perforation or hole the filling up of the annular space will not be hindered as the excess of the metal of one side will readily be squeezed to the opposite side.

If required, only one of the exterior sheets may be indented by opposing a flat plate to one half of the above arrangement.

The parts of the combined press-welding machine may be actuated mechanically, pneumatically or by all other suitable power driven means.

The invention will also be applicable to the assembly of non-metallic meltable materials with metallic pieces.

In certain cases during the phase of indentation the heating current intensity may be varied by acting upon the primary feeding of the transformer either in function of time, by time lag relay, or in function of the progressive depth of the indentation, by the controls of the main gear.

While I have described my invention using the example of interposing an aluminium sheet between two steel sheets and uniting them by spot welding, it is obvious that the invention is applicable also to other metals. I therefore do not wish to limit my invention to the particular example given.

Having thus described the invention, what is claimed as new and desired to be secured by Letters Patent, is:

1. A spot welding machine for uniting fusible sheet metal pieces, which are superpositioned to each other to form, respectively, outer work pieces and an intermediate work piece having a perforation; comprising annular holding means for pressing said work pieces together, annular electrodes for applying electric heat to and deforming said outer work pieces at the location of said perforation of said intermediate work piece to thereby obtain dents in said outer work pieces for contact with each other in said perforation, spot welding electrodes for applying welding heat to said outer work pieces at the location of said dents, guide means operatively connected to said holding means, said annular electrodes, and said spot welding electrodes, respectively, and means for moving said guide means in predetermined sequence.

2. In a spot-welding machine for uniting fusible sheet metal pieces, which are superpositioned to form outer work pieces and an intermediate work piece with at least one perforation; holding means for pressing said work pieces together, intermediate electrode means for deforming at least one of said outer work pieces at the location of said perforation of said intermediate work piece to thereby obtain a dent in said one outer work piece for contact with the other of said outer work pieces in said perforation, inner electrode means for applying heat to said outer work pieces at the location of said dent, guide means operatively connected to said holding means, said intermediate electrode means and said inner electrode means, respectively, and means describing a cycle of rotation to thereby move said guide means in predetermined sequence, whereby said holding means is first actuated, then the intermediate electrode means, and finally said inner electrode means while said intermediate electrode means is being retracted from said work pieces.

3. In a spot-welding machine for uniting fusible sheet metal pieces, which are superpositioned to form outer work pieces and an intermediate work piece with at least one perforation; holding means for pressing said work pieces together, intermediate electrode means for deforming at least one of said outer work pieces at the location of said perforation of said intermediate work piece to thereby obtain a dent in said one outer work piece for contact with the other of said outer work pieces in said perforation, inner electrode means for applying heat to said outer work pieces at the location of said dent, guide means operatively connected to said holding means, said intermediate electrode means and said inner electrode means, respectively, and means describing a cycle of rotation to thereby move said guide means in predetermined sequence, whereby said holding means is first actuated, then the intermediate electrode means, and finally said inner electrode means while said intermediate electrode means is being retracted from said work pieces, said guide means forming reciprocably movable levers, the respective ends of said levers being arranged to move about a common center.

4. A spot-welding machine for uniting fusible work pieces which are arranged in superposed position so as to form outer work pieces, upper work piece and lower work piece, respectively, and an intermediate work piece having at least one perforation; comprising holding means adapted to clamp said upper work piece with said lower work piece and to center the perforation of said intermediate work piece with respect to said upper and lower work pieces, annular electrode means adapted to deform at least one of said outer work pieces at the location of said perforation of said intermediate work piece to thereby force material of said one outer work piece for contact with said other outer work piece into said perforation, welding electrode means for spot-welding said outer work pieces at the location of said perforation and positioned to be embraced by said annular electrode means, and respective means operatively connected to said holding means, said annular electrode means and said welding electrode means and arranged to be guided toward and from said work pieces in predetermined sequence of operation whereby said annular electrode means is retracted from said work pieces upon contact of said welding electrode means with said work pieces.

5. A spot welding machine according to claim 4, wherein said holding means, said annular electrode means and said welding electrode means are arranged concentrically and around said perforation of said intermediate work piece.

ERNEST KATZ.

REFERENCES CITED

The following references are of record in the file of this patent:

UNITED STATES PATENTS

| Number | Name | Date |
|---|---|---|
| 1,754,051 | Rosenberg | Apr. 8, 1930 |
| 1,888,148 | Sciaky | Nov. 15, 1932 |
| 2,024,239 | McBain | Dec. 17, 1935 |
| 2,045,523 | Fassler | June 23, 1936 |
| 2,066,791 | McBain | Jan. 5, 1937 |
| 2,109,461 | Brown | Mar. 1, 1938 |
| 2,205,680 | Caputo | June 25, 1940 |
| 2,214,760 | Brown | Sept. 17, 1940 |
| 2,319,455 | Hardman et al. | May 18, 1943 |

FOREIGN PATENTS

| Number | Country | Date |
|---|---|---|
| 866,131 | France | Apr. 7, 1941 |